3,157,706
PROCESS FOR THE PRODUCTION OF
DINITROTOLUENE
Azuhiro Ozeki and Akira Kanemaru, Tsurusaki-shi, Oita, Japan, assignors to Sumitomo Chemical Company, Ltd., Higashi-ku, Osaka, Japan, a corporation of Japan
No Drawing. Filed Feb. 5, 1963, Ser. No. 256,251
Claims priority, application Japan, Feb. 9, 1962, 37/4,939
6 Claims. (Cl. 260—645)

This invention relates to an improvement in the process for the production of dinitrotoluene with a mixed acid consisting of nitric acid, sulfuric acid and a small amount of water, said improvement comprising use of a specific amount of the mixed acid having a specific composition at a certain reaction condition.

An object of the invention is to provide a novel process by which dinitrotoluene having a high purity, for example, suitable for the production of tolylene diisocyanate, can be produced with minimized amounts of unreacted nitrotoluene and the by-products, such as trinitrotoluene and nitrocresols.

It has now been found that, when the amount of nitric acid to be used is more than 1.08 times as much as the theoretical value according to the conventional process for the production of dinitrotoluene from mononitrotoluene, trinitrotoluene is produced as by-product, and when the amount is less than 1.01 times as much as the theoretical value, some mononitrotoluene remains unreacted, and, moreover, nitrocresols tend to increase with the decrease of nitric acid to be used.

It has also been discovered that when concentration of sulfuric acid in a mixed acid is higher than 65%, trinitrotoluene is produced as by-product, and when said concentration is lower than 60%, some mononitrotoluene remains unreacted. The reaction temperature is preferably below 75° C. A stainless steel, lead or glass reactor can remarkably prevent the production of nitrocresols, as compared with an iron reactor. In order to reduce the amount of nitric acid used, and to carry out the reaction smoothly, a part of, or all of, the waste acid from the previous nitration run which contains dinitrotoluene dissolved in a small amount may be employed. Thus, the elevation of the reaction temperature due to the heat of reaction can be controlled and the operation and the reactor system can also be simplified. As the reaction takes place instantly, the efficiency of the reaction depends upon the following two points, that is, one is how to contact well mononitrotoluene with a mixed acid, and the other is how to eliminate well the heat of reaction from the reaction mixture without partial heat accumulation. The former is attained by effecting the mixing with a pump, mixer or a violent stirring system, the latter is attained by recycling the waste acid. The process of the present invention can produce commercially with safety dinitrotoluene of good quality, by combining the above-described conditions most effectively.

According to the present invention, the process for the production of dinitrotoluene comprises nitrating mononitrotoluene with a mixed acid consisting of 33–36% by weight of nitric acid, 60–65% by weight of sulfuric acid and the remainder of water, wherein the amount of nitric acid to be used is 1.01–1.08 times as much as the theoretical value, at a reaction temperature below 75° C. in the presence or absence or some or whole waste acid from the previous nitration run, thereby obtaining dinitrotoluene which contains less than 0.1% of unreacted nitrotoluene, trinitrotoluene and mononitro- or dinitrocresol, respectively.

In another aspect, the present invention provides an improvement in the process of the production of dinitrotoluene by nitration of mononitrotoluene with a mixed acid containing nitric acid and sulfuric acid, said improvement comprising that the said mixed acid contains 60% to 65% by weight of sulfuric acid and is employed in such an amount that the amount of nitric acid in the mixed acid is 1.01 to 1.08 times as much as the theoretical amount based upon mononitrotoluene, and the nitration reaction is carried out at a temperature below 75° C. If desired, the nitration reaction may be carried out in the presence of at least a part of the previous nitration run.

The nitration reaction of the present invention may be conducted in batch, semi-continuous or continuous system. Any way, mononitrotoluene and a mixed acid as identified above, along with or without a waste acid, are well contacted together at a temperature as identified above. After completion of the reaction, the reaction mixture is separated in two layers. The upper layer, dinitrotoluene, is separated and washed with water, if desired, for recovery. All of, or a part of, the lower layer, the waste acid, may be used or recycled to the following nitration reaction. The amount of the waste acid, if added to the starting nitration materials, is preferably not more than two times amount of mixed acid. The remainder of the waste acid may be diluted with water to separate the dissolved dinitrotoluene, which may be extracted with mononitrotoluene to be used for the next run.

In order that the invention may be more fully understood, the following examples are given by way of illustration only. Unless otherwise indicated all parts and percentages used herein are by weight.

*Example 1*

Into a stainless steel vessel equipped with baffle plates were charged 600 parts of p-nitrotoluene and 400 parts of a waste acid from the previous nitration run and the mixture was heated at 45° C. A mixed acid consisting of 280 parts of nitric acid, 505 parts of sulfuric acid and 4 parts of water was added therein dropwise over about 5 hours with a violent stirring, while the temperature was gradually elevated, but not exceeding 65° C. After the reaction mixture was kept stirred at 65° C. for about an hour, the upper layer was withdrawn, leaving 400 parts of the lower layer comprising a waste acid. By addition to the waste acid to adjust the concentration of sulfuric acid to 76%, dinitrotoluene dissolved was completely separated from the waste acid and washed with water. The product contained less than 0.1% of low boiling point substances, less than 0.1% of unreacted nitrotoluene, less than 0.1% of trinitrotoluene and less than 0.05% of nitrocresols. The yield was 98.5% of the theory.

*Example 2*

Into a lead-homogenized cast-iron vessel were charged 250 parts of p-nitrotoluene, 350 parts of o-nitrotoluene and 300 parts of a waste acid from the previous nitration run and the mixture was heated to 35° C. A mixed acid consisting of 290 parts of nitric acid, 572 parts of sulfuric acid and 13 parts of water was added therein dropwise, while the temperature was gradually elevated to 65° C. over about 5 hours. After the reaction mixture was kept at 75° C. for 2 hours, the mixture was withdrawn, leaving some of the waste acid. By addition of water to the mixture, dinitrotoluene was separated from the acid layer o-nitrotoluene to be used in the next run was added to the acid layer to dissolve dinitrotoluene in the latter and employed as starting material of the next run. The product and the yield thus obtained was the same as in Example 1.

*Example 3*

Into a stainless steel reactor were fed constantly nitrotoluene and a mixed acid consisting of 33.5% of nitric acid, 64% of sulfuric acid and 2.5% of water at the rate of 120 kg./d. and 176 kg./d., respectively, and the both materials were allowed to react continuously, while the reaction temperature was kept at 70° C., the stirring speed was at 300 r.p.m. The effluent reaction mixture from the reactor was passed to a separator, where dinitrotoluene dissolved was completely separated from the acid by addition of water to adjust the concentration of the waste acid to 76%. The product contained less than 0.1% of low boiling point substances, less than 0.1% of unreacted nitrotoluene and less than 0.05% of nitrocresols. Dinitrotoluene was obtained at the rate of 157 kg./d.

*Example 4*

Into a stainless steel reactor were fed constantly nitrotoluene and a mixed acid consisting of 34.0% of nitric acid, 64.5% of sulfuric acid and 1.5% of water at the rate of 120 kg./d. and 164 kg./d., respectively, and the both materials were allowed to react continuously, while the reaction temperature was kept at 70° C. and the stirring speed was at 300 r.p.m. The effluent reaction mixture from the reactor was passed to the first separator. A part of the waste acid was withdrawn from the lower layer and recycled to the reactor at the rate of from 150 to 240 kg./d. The residual waste acid was passed to the second separator, where dinitrotoluene was completely separated from the acid by diluting the acid to 76% concentration with water. The product thus obtained contained less than 0.1% of low boiling point substances, less than 0.1% of unreacted nitrotoluene and less than 0.05% of nitrocresols. Dinitroluene was obtained at the rate of 158 kg./d.

What we claim is:

1. In the process of the production of dinitroluene by nitration of mononitrotoluene with a mixed acid containing nitric acid and sulfuric acid, an improvement comprising employing a mixed acid containing 60% to 65% by weight of sulfuric acid and in such an amount that the amount of nitric acid in the mixed acid is 1.01 to 1.08 times as much as the theoretical amount based upon mononitrotoluene, and carrying out the nitration reaction at a temperature below 75° C.

2. In the process of the production of dinitrotoluene by nitration of mononitrotoluene with a mixed acid containing nitric acid and sulfuric acid, an improvement comprising employing a mixed acid containing 60% to 65% by weight sulfuric acid and in such an amount that the amount of nitric acid in the mixed acid is 1.01 to 1.08 times as much as the theoretical amount based upon mononitroluene, and carrying out the nitration reaction at a temperature below 75° C. in the presence of at least a part of the waste acid obtained in a previous nitration run.

3. In a process for the production of dinitrotoluene by nitration of mononitroluene, the improvement which comprises substantially continuously introducing into a reaction zone a mixed acid containing about 60 to 65 percent by weight of sulfuric acid and about 33 percent to 36 percent by weight of nitric acid, substantially continuously introducing mononitrotoluene into the reaction zone, regulating the rates of introduction of the mixed acid and of the mononitrotoluene so that the amount of nitric acid in the mixed acid is about 1.01 to 1.08 times as much as the theoretical amount based upon mononitrotoluene maintaining the temperature within the reaction zone below about 75° C., passing the effluent reaction mixture to a separation zone, and recovering substantially pure dinitrotoluene from the separation zone.

4. A process according to claim 3, wherein the temperature within the reaction zone is maintained at about 70° C.

5. A process according to claim 3, further comprising recycling mixed acid obtained from the effluent reaction mixture in the separation zone to the reaction zone.

6. A process according to claim 3, further comprising introducing an aqueous medium into the separation zone to obtain a layer consisting essentially of dinitrotoluene and a lower aqueous layer containing unreacted mixed acid, recycling a portion of the aqueous layer to the reaction zone, and recovering additional dinitrotoluene from the remainder of the aqueous layer in a second separation zone.

References Cited by the Examiner

UNITED STATES PATENTS 2,947,791   8/60   Adams _____ 260—645

CARL D. QUARFORTH, *Primary Examiner*.